UNITED STATES PATENT OFFICE.

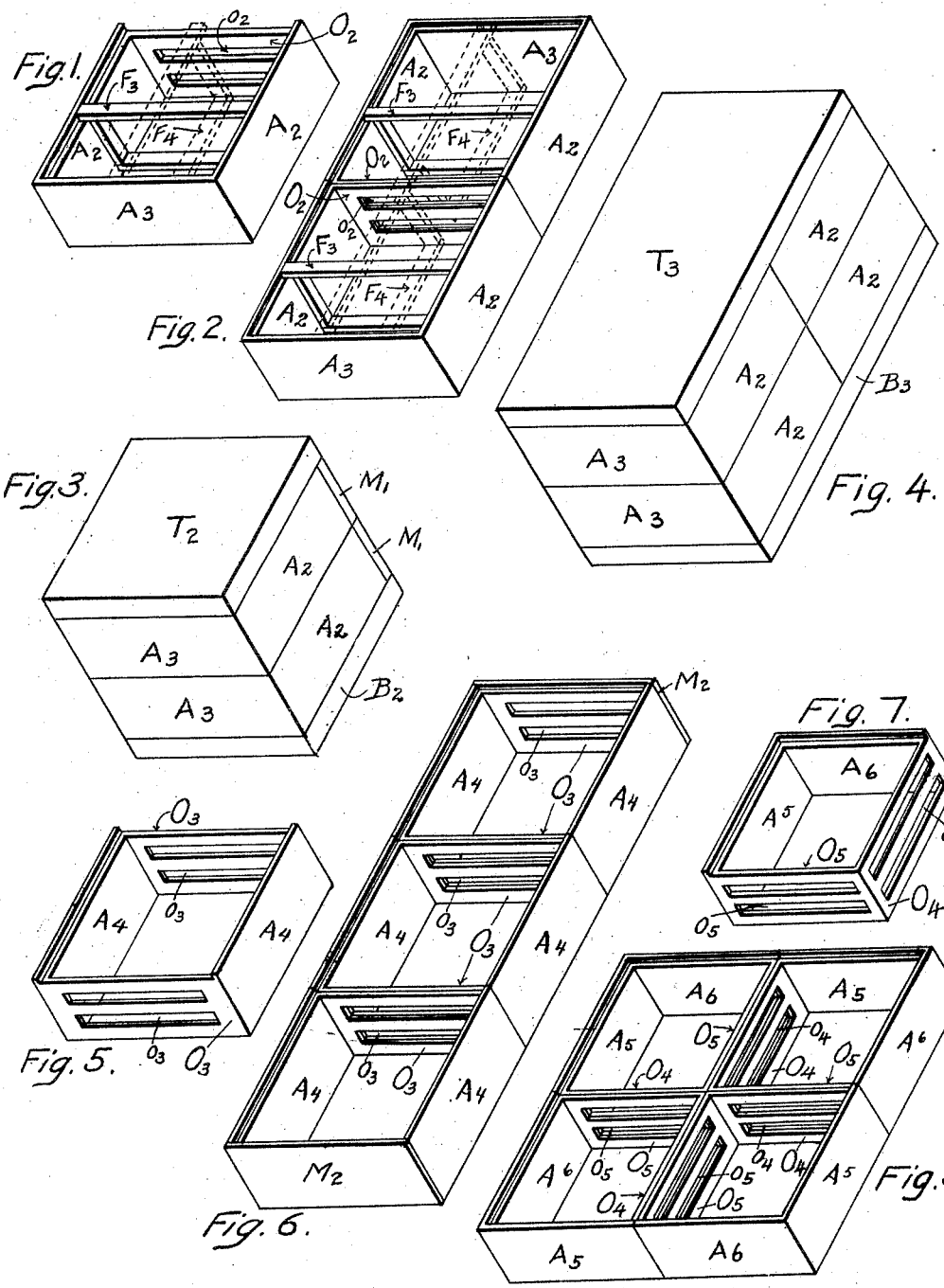

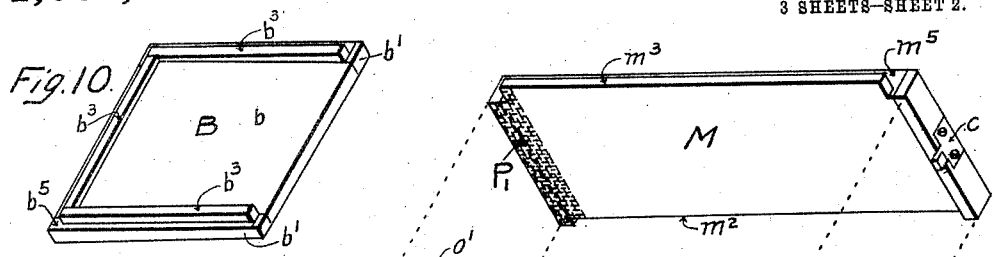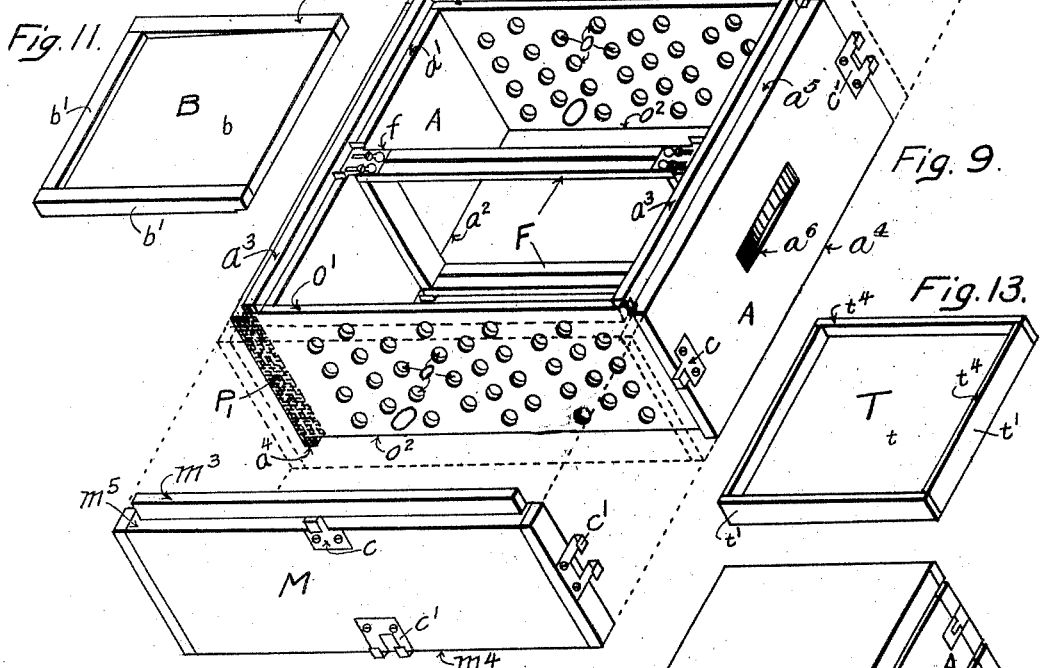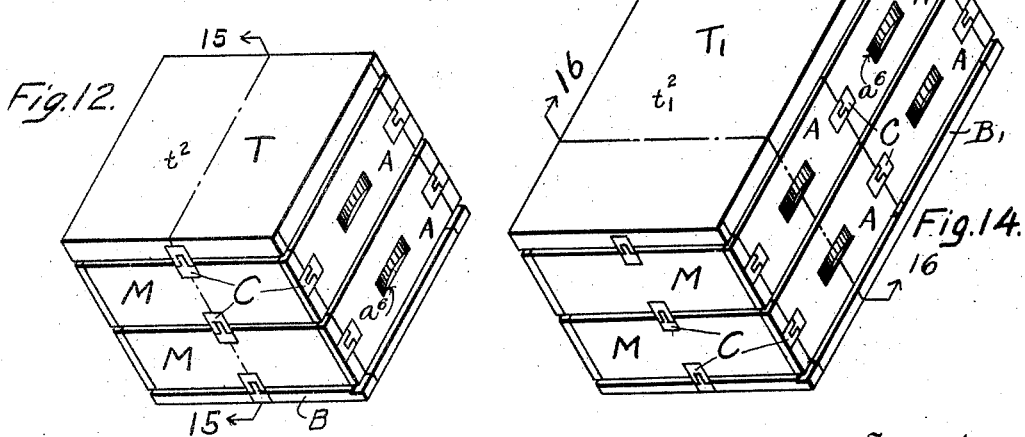

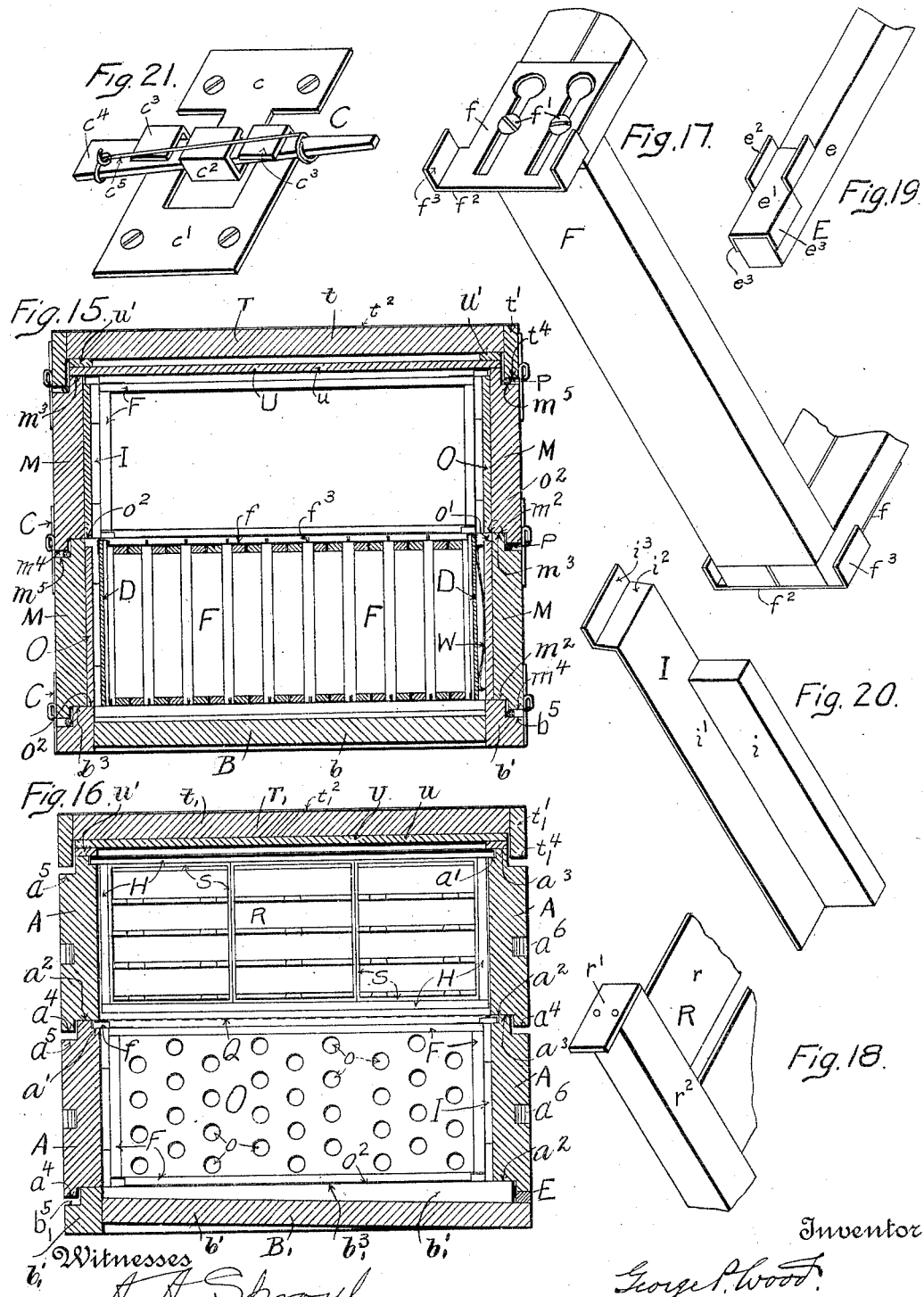

GEORGE P. WOOD, OF PEEKSKILL, NEW YORK.

BEEHIVE.

1,068,196.  Specification of Letters Patent.  Patented July 22, 1913.

Application filed May 4, 1908. Serial No. 430,735.

*To all whom it may concern:*

Be it known that I, GEORGE P. WOOD, a citizen of the United States, residing at No. 217 Walnut street, in the village of Peekskill, county of Westchester, and State of New York, have invented new and useful Improvements in Beehives, of which the following is a specification.

My invention relates to certain improvements in the construction of beehives and has for its principal object the construction of rectangular-movable-frame-beehive-sections which can be assembled and united in various ways to form beehives of the shape and size required at different seasons for the best management of bees.

My invention primarily consists of rectangular-movable-frame-beehive-sections, through one or more sides of which open space is provided for the passage of bees to and from similar beehive-sections in the same story or level; the beehive-sections being so constructed that they can also be readily united, one over the other.
My invention also includes certain appliances which are useful in the manipulation of the rectangular-movable-frame-beehive-sections, hereinafter designated hive-sections, and the care of bees contained in same.
The drawings illustrate and the specification describes the invention in varied forms and with varied application.

In these drawings: Figure 1 is an isometric drawing of a hive-section in one side of which open space is provided for the passage of bees to and from a similar hive-section. This also shows a single frame by full lines and the same in an alternate position by dotted lines. Fig. 2 is an isometric drawing of two hive-sections, that shown in Fig. 1, united in one story, with outer faces of sides containing open space for the passage of bees, coinciding. Fig. 3 is an isometric drawing of a beehive consisting of two hive-sections, like that shown in Fig. 1, with detachable sides closing the open space provided for the passage of bees, united one over the other, with bottom board and top board. Fig. 4 is an isometric drawing of a beehive consisting of four hive-sections, like that shown in Fig. 1, united to form two stories, each like that shown in Fig. 2, with bottom board and top board. Fig. 5 is an isometric drawing of a hive- section, in two opposite sides of which open space is provided for the passage of bees to and from similar hive-sections. Fig. 6 is an isometric drawing of three hive-sections, like that shown in Fig. 5, united in one story with outer faces of sides containing open space for the passage of bees coinciding where united, and with detachable side closing the open space provided for the passage of bees, at one extreme. Fig. 7 is an isometric drawing of a hive-section in two adjacent sides of which open space is provided for the passage of bees to and from similar hive-sections. Fig. 8 is an isometric drawing of four hive-sections, like that shown in Fig. 7, united in one story with outer faces of sides containing open space for the passage of bees coinciding where united. Fig. 9 is an isometric drawing of a hive-section in two opposite sides of which open space is provided for the passage of bees to and from similar hive-sections, with detachable sides for closing the open space provided for the passage of bees. These detachable sides are shown in position by dotted lines and moved a little to the side by full lines. This also shows a single frame. Fig. 10 is an isometric drawing of a bottom board. Fig. 11 is an isometric drawing of an inverted bottom board. Fig. 12 is an isometric drawing of a beehive consisting of two hive-sections like that shown in Fig. 9, united one over the other, with bottom board, inside cover and top board. Fig. 13 is an isometric drawing of an inverted top board. Fig. 14 is an isometric drawing of a beehive consisting of four hive-sections, like that shown in Fig. 9 with the omission of one detachable side from each, united in pairs one over the other, with bottom board, inside cover and top board. Fig. 15 is a vertical section of beehive shown in Fig. 12, taken on line 15—15, Fig. 12, Fig. 16 is a vertical section of beehive shown in Fig. 14, taken on line 16—16, Fig. 14, Fig. 17 is an isometric drawing showing a device for supporting and spacing movable frames, and a portion of a frame. This is the same device shown on a single frame to smaller scale in Fig. 9, and also in Figs. 15 and 16. Fig. 18 is an isometric drawing showing a device for supporting a regulating fence, and a portion of a regulating fence. Fig. 19 is an isometric drawing of a device for securing an adjustable entrance block in position, and a portion of an entrance block. Fig. 20 is an isometric drawing of a spacing block for insertion between frames or honey-section cases and the sides of hive-sections or beehives. Fig. 21 is an isometric drawing of a clamp for fastening various parts of hive-sections and beehives together.

In these drawings, various principal parts are uniformly designated by capital or upper case letters, in some instances with subscript figures, as follows: A, $A_2$, $A_3$, $A_4$, $A_5$, and $A_6$—Complete fixed side of hive-section. B, $B_1$, $B_2$, and $B_3$—Bottom board or platform upon which hive-sections or beehives rest. C—Clamp for fastening parts of hive-sections and beehives together. D—Division board. E—Entrance block. F, $F_3$ and $F_4$—Movable frame. H—Honey-section case or holder. I—Inserted spacing block. M, $M_1$ and $M_2$—Movable or detachable side of hive-section. O, $O_2$, $O_3$, $O_4$ and $O_5$—Fixed side of hive-section in which open space for the passage of bees is provided. P and $P_1$—Packing to prevent entrance of wind, water, etc. Q—Queen excluder. R—Regulating fence or separator. S—Section for comb honey. T, $T_1$, $T_2$ and $T_3$—Top board or cover. U—Under or inside cover. W—Wedging spring. Details of these parts are uniformly designated by the corresponding small or lower case letters, with accent and subscript figures in some instances.

Figs. 1 to 8 inclusive illustrate the general principle and scope of the main feature of my invention and are not intended to show any special details of construction. These, and some other figures, show only such frames and parts, not claimed as new, as are necessary for a complete understanding of my invention. In these figures open space for the passage of bees through sides $O_2$, $O_3$, $O_4$ and $O_5$ of hive-sections is represented at $o_2$, $o_3$, $o_4$ and $o_5$ respectively. Detachable sides for combination with sides containing open space are represented by $M_1$ and $M_2$ in Figs. 3 and 6 respectively. Various forms of complete fixed sides are represented by $A_2$, $A_3$, $A_4$, $A_5$ and $A_6$. Frames in alternate positions are represented by $F_3$ and $F_4$ in Figs. 1 and 2 by full and dotted lines respectively. Top boards are represented by $T_2$ and $T_3$ in Figs. 3 and 4 and bottom boards by $B_2$ and $B_3$ in the same figures.

In the management of bees it is considered desirable to change the form of the hive at certain seasons of the year. Thus, for wintering, a hive nearly cubical in form with direct bee passages leading from the center of same to the stores of honey and pollen in all parts of the hive, is desirable; while in summer the use of a shallow space for the brood chamber is conducive to the storing, immediately over same, of a large proportion of the best honey in the most marketable form. My invention provides for making substantially these changes in form as follows: Two hive-sections, such as are shown in Fig. 1, may be united one over the other as shown in Fig. 3, in such manner as to provide a bee-space between the tops of frames in the bottom hive-section and the bottoms of frames in the top hive-section, and if desired the hive-sections may be so made that the frames in the bottom hive-section may be at right angles to the frames in the top hive-section, thereby providing very direct bee passages from the cluster of bees to all parts of the hive. By combining two such hive-sections so that the open space $o_2$ for passage of bees through sides $O_2$, Fig. 2, shall coincide, a large shallow brood chamber may be obtained, upon which may be placed two similar hive-sections, as shown in Fig. 4, containing other frames or honey-sections for the storage of surplus honey. Numerous other changes in form may also be made for various purposes.

Figs. 5 and 6 show hive-sections, of which any number may be combined in a single story in one row. Figs. 7 and 8 show a form of hive-section which is adapted to the use of four hive-sections in one story; communication, through sides containing open space, being provided from each hive-section to two adjacent ones. The construction of hive-sections having open space for the passage of bees on four sides is contemplated. These may either be provided with four detachable sides or with a complete outer case of the proper size to contain one or any desired number of hive-sections.

The hive-sections are rectangular and may be square. They may be assembled in any number of stories. The various dimensions are not limited. My invention is not restricted to the use of any particular frame or to any method of supporting or securing frames in position. The use of wood, metal or any other suitable material in the construction of hive-sections is contemplated. A detachable side may consist of an outer closed side as shown, an inner side substantially equivalent to a division board or of doors, sliding or otherwise, to close the open space provided for the passage of bees to or from a similar hive-section.

Having described the general principle of my invention I will now proceed to show its adaptation to a special case in which the interior length and breadth of the hive-section are equal and admit of the frames being placed in either of two directions at right angles to each other. This hive-section is arranged for use in both the brood and surplus chambers, and has two opposite sides with open space for the passage of bees and detachable sides for use as desired. Any number of single complete hive-sections may be united one over another with corresponding sides directly over each other or at right angles, thus providing a most desirable arrangement of frames for wintering without the necessity of disturbing any of the individual frames.

In Fig. 9 the sides O, containing openings $o$, for the passage of bees, are secured to the complete sides A in such manner that their top edges $o^1$, shown in Figs. 9 and 15, are at the same elevation as the rabbeted shelves $a^1$, in sides A, thus forming a continuous shelf around the upper part of hive-section for the support of frames F, shown in Figs. 9, 15 and 16 and honey-section cases H, shown in Fig. 16. This shelf is about a bee space below the top edges $a^3$, of sides A shown in Figs. 9 and 16 and $m^3$, of detachable sides M shown in Figs. 9 and 15, which form the support for inside cover U, shown in Figs. 15 and 16, or a superimposed hive-section. The bottom edges $o^2$, of sides O, shown in Figs. 9, 15 and 16, are at the same elevation as the rabbeted base $a^2$, in sides A, shown in Figs. 9 and 16, and $m^2$, of sides M, shown in Figs. 9 and 15, which are all designed to rest upon the top edges $b^3$ of cleats $b^1$, which form a part of bottom board B, shown in Figs. 10 and 15, or $b^3{}_1$, of bottom board $B_1$, shown in Fig. 16 or upon the top edges $a^3$, and $m^3$, above referred to of some other hive-section. The bottom edges $a^4$, of sides A, shown in Figs. 9 and 16, $m^4$, of sides M, shown in Figs. 9 and 15, $t^4$, of cleats $t^1$, forming a part of top board T, shown in Figs. 13 and 15, and $t^4{}_1$, of top board $T_1$, shown in Fig. 16 are the bottoms of overhanging projections provided for the purpose of making the horizontal joints between stories of hive-sections, and between hive-sections and bottom boards or top boards, weatherproof. A bee-space is provided between these edges and the corresponding rabbeted shelves $a^5$, $m^5$, $b^5$ and $b^5{}_1$ of sides A and M and bottom boards B and $B_1$, to avoid crushing the bees when sliding the hive-sections into position. These joints are made very tight at any desired time by inserting the packing P in these bee-spaces and then clamping the hive-sections, top board and bottom board tightly in position.

The bottom edges of the complete hive-section are alike in profile on all four sides, and the entrance spaces are provided by means of the cleats $b^1$ and $b^1{}_1$, on three sides of bottom boards. These cleats are shown in Figs. 10 and 11 and also in Figs. 15 and 16. The board $b$ or $b_1$ is raised at the back edge to reduce the distance between it and the bottom bars of frames, and also to provide drainage for any water that may be driven in at entrance. This is shown in Fig. 16.

When the sides M of hive-sections have been detached, there is nothing to prevent sliding one hive-section upon another, or upon a bottom board; the only parts in contact being $a^2$ and $a^3$ or $a^2$ and $b^3$ or $b^3{}_1$. This is important, for the reason that it makes the use of the overhanging projections possible without killing bees in manipulating. The general principle of the overhanging edges is old, but the provision shown for sliding the parts horizontally into position instead of lowering them into position, is new.

The inside cover U, shown in Figs. 15 and 16, consists of a board $u$ with cleats $u^1$ secured to one side around the edges. This cover is designed to slide into position, thereby confining the bees to the interior of hive before the top board T, or $T_1$, is lowered into position. If honey-section cases are in use, and a bee-space on top of same is desired, this cover is put in place with the cleats underneath as shown in Fig. 16. If brood frames are on top, as in wintering, this bee-space is not usually required, and the inside cover is used with the cleats on top, resulting in a closed air space between the top board and inside cover as shown in Fig. 15.

The top board T, or $T_1$, consists of the board $t$ or $t_1$ with cleats $t^1$ and $t^1{}_1$ with overhanging edges $t^4$ and $t^4{}_1$ previously referred to and a waterproof covering $t^2$ and $t^2{}_1$.

The method of supporting and spacing brood frames F, and honey-section cases H, is illustrated by Figs. 9, 15, 16 and 17. The top of brood frame proper is at the same elevation as the shelves $a^1$, or edges $o^1$, which support it. The hanger $f$, for supporting frame is shown in Fig. 17. This is secured to the frame by screws $f^1$ in slots which admit of the hanger being adjusted in position so that the edge $f^2$ will project to the required extent beyond the frame proper. This edge has the full width of a frame and space between frames so the projections $f^3$ therefrom are in contact with like projections on hangers of adjacent frames. The ends of these hangers practically cover the supporting shelves $a^1$, or edges $o^1$ and prevent the bees from depositing propolis on same. The projections $f^3$ extend to a height of about a bee-space above the tops of frames and support the thin queen excluder Q, and also serve to prevent vertical movement of frames. By loosening the screws, these hangers may be removed and replaced in an inverted position as shown at bottoms of frames where they are also used to space the frames. By means of this device the frames are reversible. If desired they may be adjusted when used at bottoms of frames to space same longitudinally. The bottom of brood frame is at the same elevation as the rabbeted bases $a^2$, and $m^2$, of hive-section and consequently about a bee-space above the tops of brood frames in another hive-section placed under same as shown in Fig. 15. The honey-section case H, which has approximately the same height as the brood frame F, has a top bar which rests on top of the shelves $a^1$ or edges $o^1$ and of such thickness that its top surface is nearly flush with the edges $a^3$, and $m^3$, while the under surface of bottom bar is nearly a bee-space above the rabbeted bases $a^2$ and $m^2$, and edges $o^2$. As a result of this arrangement a thin queen excluder Q, may be placed a bee-space above the brood frames and a bee-space below the honey-section cases, as shown in Fig. 16. The queen excluder is such as are in common use. If one hive-section containing honey-section cases is placed on top of another, there will be only a single bee-space between the two tiers of honey-section cases, and the same between two tiers of brood frames.

The wedging spring shown in Fig. 15 is an article in common use and is shown to illustrate the method of using the various spacing devices.

The hanger for regulating fences shown in Fig. 18 is substantially the same in principle as the frame hangers hereinbefore described in that it allows the regulating fences to be entirely below the level of the supporting shelves and thereby admitting of a bee passage over same and the hangers. This is important especially in the event of honey-section cases being placed end to end. This hanger consists of a thin plate $r^1$, secured to the top of end cleats $r^2$, which unite the slats $r$, by means of one or more nails or screws or by means of a bent projecting point of the plate itself.

The inserted spacing block I, shown in Fig. 20, consists of a spacing block $i$, attached to a thin plate $i^1$, so shaped that the portion $i^2$, will rest on the shelf for supporting frames, with projecting portion $i^3$, at rear edge of same. When the frame is placed in position it rests on top of the bent portion $i^2$, and the projecting portion $i^3$, together with the lower portion of plate $i^1$, back of frame end-bar, keeps the block from being moved out of position.

The entrance block E, shown in Fig. 19, consists of a simple wooden slide $e$, which may be pushed along under the overhanging projection of hive-section at entrance and on top of the bottom board, and a metal device $e^1$, which may be pushed in between the wooden slide and edge of hive-section. This metal device has flanges $e^2$ and $e^3$, which clasp the edge of hive-section and block, locking same together transversely.

The packing $P_1$ shown in Fig. 9 is for the purpose of making the joint between sides O and M weather proof. It may be of felt or any other suitable material.

The hand holes $a^6$ in sides A, Figs. 9, 12, 14 and 16, are for use in lifting or otherwise moving the hive-section as a unit, whether the sides M are clamped in position or not.

The clamp C shown in Fig. 21 consists of the two plates $c$ and $c^1$, attached to the separate parts of hive-section or beehive which are to be clamped. These two plates have hooked ends, or equivalent, $c^2$ and $c^3$ respectively, which are engaged by a wedge $c^4$. The wire $c^5$, attached to the wedge is for the purpose of preventing the wedge from falling out of position in the event of its being loosened, and for making the clamp perfectly secure for the shipment of bees, or for other purposes. By attaching the parts of clamps at rights and lefts conflict is avoided. These clamps are indicated in Figs. 9, 12, 14, and 15.

It is evident that nearly all of the foregoing details shown and described are applicable to square hive-sections having only one double side providing space for the passage of bees, except that only two of such hive-sections could be combined in a single story, and also to rectangular hive-sections, having either one or opposite double sides providing open space for the passage of bees, except that only two of such hive-sections could be combined in a single story in the first instance, and the frames in one story may not be readily placed at right angles to those in another story.

Having described my invention what I claim is:

1. A hive-section comprising four nearly vertical sides or walls, one or more of which contain an opening or openings adapted for combination with one or more similar hive-sections to form a compartment of one story by having the corresponding sides containing the openings placed in juxtaposition in such manner as to provide communicating passageways for the bees from one hive-section to another, and also adapted for combination in more than one story by placing one or more similar hive-sections or combinations of similar hive-sections one over another.

2. A brood chamber formed by a combination of two or more hive-sections each comprising four nearly vertical sides or walls, one or more of which contain an opening or openings adapted for combination with one or more similar hive-sections to form a compartment of one story by having the corresponding sides containing the openings placed in juxtaposition in such manner as to provide communicating passageways for the bees from one hive-section to another, and also adapted for combination in more than one story by placing one or more similar hive-sections or combinations of similar hive-sections one over another thereby forming a broad and shallow brood chamber or one having about the same volume and a greater depth, as desired.

3. A bee-hive formed by the combination of two or more hive-sections each comprising four nearly vertical sides or walls, one or more of which contain an opening or openings adapted for combination with one or more similar hive-sections to form a compartment of one story by having the corresponding sides containing the openings placed in juxtaposition in such manner as to provide communicating passageways for the bees from one hive-section to another, and also adapted for combination in more than one story by placing one or more similar hive-sections or combinations of similar hive-sections one over another thereby forming a broad and shallow beehive or one having a greater depth in proportion to its volume, as desired.

4. A square hive-section comprising four nearly vertical sides or walls, one of which contains an opening or openings adapted for combination with another similar hive-section to form a compartment of one story by having the corresponding sides containing the openings placed in juxtaposition in such manner as to provide communicating passageways for the bees between the two hive-sections and also adapted for combination with one or more similar hive-sections or combinations of similar hive-sections in more than one story by placing one over another, all substantially as set forth.

5. A square hive-section comprising four nearly vertical sides or walls, two of which contain openings adapted for combination with one or more similar hive-sections to form a compartment of one story by having the corresponding sides containing the openings placed in juxtaposition in such manner as to provide communicating passageways for the bees between the hive-sections and also adapted for combination with one or more similar hive-sections or combinations of similar hive-sections in more than one story by placing one over another, all substantially as set forth.

6. A hive-section comprising four nearly vertical sides or walls, one of which is double consisting of a fixed part containing an opening or openings and a detachable part for closing the opening or openings in the fixed part, united to form an approximately rectangular compartment for containing movable frames and adapted for combination with another similar hive-section in one story by removing the corresponding detachable parts and having the corresponding fixed parts containing the openings placed in juxtaposition in such manner as to provide communicating passageways for the bees between the two hive-sections and also adapted for combination with one or more similar hive-sections or combinations of similar hive-sections in more than one story by placing one over another with the detachable parts in position when the double sides form part of the outer wall of the beehive, all substantially as set forth.

7. A hive-section comprising four nearly vertical sides or walls, of which two opposite ones are double, each consisting of a fixed part containing an opening or openings and a detachable part for closing the opening or openings in the fixed part, united to form an approximately rectangular compartment for containing movable frames and adapted for combination with one or more other similar hive-sections in one story by having the corresponding fixed parts containing the openings placed in juxtaposition, with the detachable parts removed, in such manner as to provide communicating passageways for the bees between the hive-sections and also adapted for combination with one or more similar hive-sections or combinations of similar hive-sections in more than one story by placing one over another, all substantially as set forth.

8. A hive-section comprising four nearly vertical sides or walls, one of which is double consisting of a fixed part containing an opening or openings and a detachable part for closing the opening or openings in the fixed part, united to form an approximately square compartment for containing movable frames and adapted for combination with another similar hive-section in one story by having the corresponding fixed parts containing the openings placed in juxtaposition, with the detachable parts removed, in such manner as to provide communicating passageways between the two hive-sections and also adapted for combination with one or more similar hive-sections or combinations of similar hive-sections in more than one story by placing one over another, all substantially as set forth.

9. A hive-section comprising four nearly vertical sides or walls, of which two opposite ones are double, each consisting of a fixed part containing an opening or openings and a detachable part for closing the opening or openings in the fixed part, united to form an approximately square compartment for containing movable frames and adapted for combination with one or more similar hive-sections in one story by having the corresponding fixed parts containing the openings placed in juxtaposition, with the detachable parts removed, in such manner as to provide communicating passageways for the bees between the hive-sections and also adapted for combination with one or more similar hive-sections or combinations of similar hive-sections in more than one story by placing one over another, all substantially as set forth.

10. A hive-section comprising four nearly vertical sides or walls, one of which is double consisting of a fixed part containing an opening or openings and a detachable part for closing the opening or openings in the fixed part, united to form an approximately square compartment for containing movable frames placed either parallel to or at right angles to the double side and adapted for combination with another similar hive-section in one story by having the corresponding fixed parts containing the openings placed in juxtaposition, with the detachable parts removed, in such manner as to provide communicating passageways for the bees between the two hive-sections and also adapted for combination with one or more similar hive-sections or combinations of similar hive-sections in more than one story by placing one over another, all substantially as set forth.

11. A hive-section comprising four nearly vertical sides or walls, of which two opposite ones are double, each consisting of a fixed part containing an opening or openings and a detachable part for closing the opening or openings in the fixed part, united to form an approximately square compartment for containing movable frames placed either parallel to or at right angles to the double sides and adapted for combination with one or more similar hive-sections in one story by having the corresponding fixed sides containing the openings placed in juxtaposition, with the detachable parts removed, in such manner as to provide communicating passageways for the bees between the hive-sections and also adapted for combination with one or more similar hive-sections or combinations of similar hive-sections in more than one story by placing one over another, all substantially as set forth.

12. A device for supporting movable frames in beehives and spacing same in all directions, consisting of a slotted hanger plate $f$, having side projections $f^2$ extending upward, and adapted to be reversibly and adjustably attached to the bar of the frame with or without the end projecting, by fastening means passing through the slots, and adapted to support the frame from rabbeted shelves or top edges of the hive with the frame proper lying entirely below the supporting edges, substantially as set forth.

13. In combination, a beehive comprising two or more hive-sections placed one over another, each section provided with supporting edges below the uppermost edges of the section, brood frames and honey-section cases each of a height less than the effective height of the hive sections, said honey-section cases having top bars adapted to be supported on the supporting edges of the hive-sections, and hangers attached to the top bars of the brood frames and adapted to rest on said supporting edges and to hold the frames proper entirely below said edges, whereby a wider space may be secured between the tops of the brood frames and the bottoms of the honey-section cases than between either two hive-sections of brood frames or two of honey-section cases, substantially as set forth.

14. In combination, a hive-section provided with supporting edges $a^1$, $o^1$ below the uppermost edges of the section adapted to support brood frames or honey-section cases, a device for providing a bee-space between the side of hive-section and brood frame or honey-section case placed parallel thereto, consisting of a block $i$ adapted to be inserted between the end bar of frame F or case H and side of hive-section, and a plate $i^1$ attached to said block and having a bent portion $i^2$ adapted to rest upon supports $a^1$ or $o^1$ with a projecting part $i^3$ extending upward and adapted to be held in position by the end $f^2$ of frame hanger or the projecting end of top bar of honey-section case, all substantially as set forth.

15. A hive-section provided with supporting edges $a^1$, $o^1$ below the uppermost edges of the section, a regulating fence R comprising end bars, and plates $r^1$ attached to the top of said end bars and projecting beyond the same, and adapted to rest upon the edges $a^1$ or $o^1$ and to support the fence entirely below said supporting edges, all substantially as set forth.

16. In a beehive comprising one or more hive-sections, hereinbefore described, an adjustable entrance block consisting of a block of the proper size to slide under the edge of hive-sections secured in position by a bent plate having projecting parts adapted to extend over both the edge of hive-section and the block, all substantially as set forth.

17. In a beehive comprising one or more hive-sections, hereinbefore described, a bottom board B having raised cleats $b^1$ on three sides of board $b$ suitable for receiving hive-sections with overhanging projections for making the horizontal joints weather-proof and forming an entrance on the fourth side by the increased projection of said cleats at ends on that side above the top surface of board $b$, all substantially as set forth.

18. In combination a hive-section with uppermost edges $a^3$, $m^3$ extending above rabbeted shelves for supporting brood-frames and honey-section cases having tops level with and projecting above said shelves respectively and a hive cover T or $T_1$, a reversible inside cover U having one plane face and one face with projections or cleats $u^1$ about a bee-space in height adapted to rest upon the uppermost edges $a^3$ and $m^3$ of hive section, for confining bees to the hive and providing a support for the hive cover T or $T_1$, the plane face to be down when used in combination with brood-frames and up when used in combination with honey-section cases thereby providing a bee-space under the inside cover in each instance and incidentally providing a dead air space between the hive cover and inside cover in the first instance, all substantially as set forth.

19. A beehive comprising a hive-section with rabbeted shelves $a^5$ and $m^5$ outside of and below its uppermost edges, a reversible inside cover U resting upon said edges for confining the bees, and a top board or cover T or $T_1$ with an outer rim $t^1$ or $t^1_1$ which forms an overhanging projection when in place with the board T or $T_1$ resting directly upon the inside cover, all substantially as set forth.

20. A beehive comprising hive-sections having overhanging projections $a^4$ and $m^4$ extending below the rabbeted base edges $a^2$ and $m^2$, and rabbeted shelves $a^5$ and $m^5$ outside of and below the uppermost edges $a^3$ and $m^3$ upon which a superimposed hive-section is adapted to rest, and the two opposite sides of each hive-section being constructed with outer detachable portions M which include the said edges $m^3$, whereby the removal of said detachable portions adapts one hive-section to slide upon another, horizontally into position, the only contact being between the rabbeted base edges $a^2$ and top edges $a^3$, and whereby the replacing of the detachable sides M secures weather-proof joints on all sides with a bee-space between the overhanging projections $a^4$ $m^4$ and rabbeted shelves $a^5$, $m^5$ under same, all substantially as set forth.

GEO. P. WOOD.

Witnesses:
A. A. SPROUL,
EGBERT P. LINCOLN.

---

Copies of this patent may be obtained for five cents each, by addressing the "Commissioner of Patents, Washington, D. C."